Aug. 23, 1960 A. W. VINCENT 2,950,350

CROSSBAR SWITCH

Filed March 12, 1957 4 Sheets-Sheet 1

Aug. 23, 1960 A. W. VINCENT 2,950,350

CROSSBAR SWITCH

Filed March 12, 1957

4 Sheets-Sheet 2

Aug. 23, 1960

A. W. VINCENT 2,950,350

CROSSBAR SWITCH

Filed March 12, 1957

4 Sheets-Sheet 3

Aug. 23, 1960 A. W. VINCENT 2,950,350

CROSSBAR SWITCH

Filed March 12, 1957 4 Sheets-Sheet 4

United States Patent Office 2,950,350
Patented Aug. 23, 1960

2,950,350

CROSSBAR SWITCH

Andrew W. Vincent, 65 Abderdeen St., Rochester 11, N.Y.

Filed Mar. 12, 1957, Ser. No. 645,609
18 Claims. (Cl. 179—27.54)

This invention relates to a crossbar switch for connecting various electric conducting members to each other in various possible combinations.

An object of the invention is the provision of a generally improved and more satisfactory crossbar switch.

Another object of the invention is the provision of a switch which is easier and less expensive to manufacture, and more reliable in use, than prior switches of the same general kind.

Still another object is the provision of a crossbar switch of particularly rugged and compact kind, easy to operate and to maintain in operative condition.

A further object is the provision of a crossbar switch in which the torsion operating members heretofore used in switches of this kind are entirely eliminated and are replaced by tension members which are more reliable and satisfactory than the previous torsion members.

These and other desirable objects may be attained in the manner disclosed as an illustrative embodiment of the invention in the following description and in the accompanying drawings forming a part hereof in which.

Figure 16:
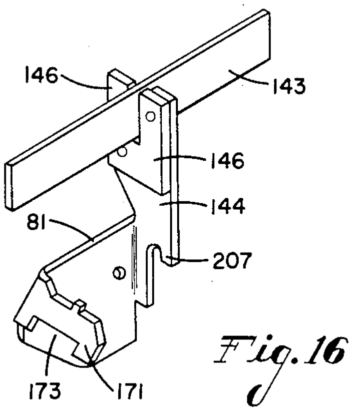
Figure 17:
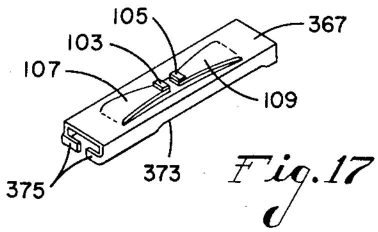
Figures 18, 19, 20:
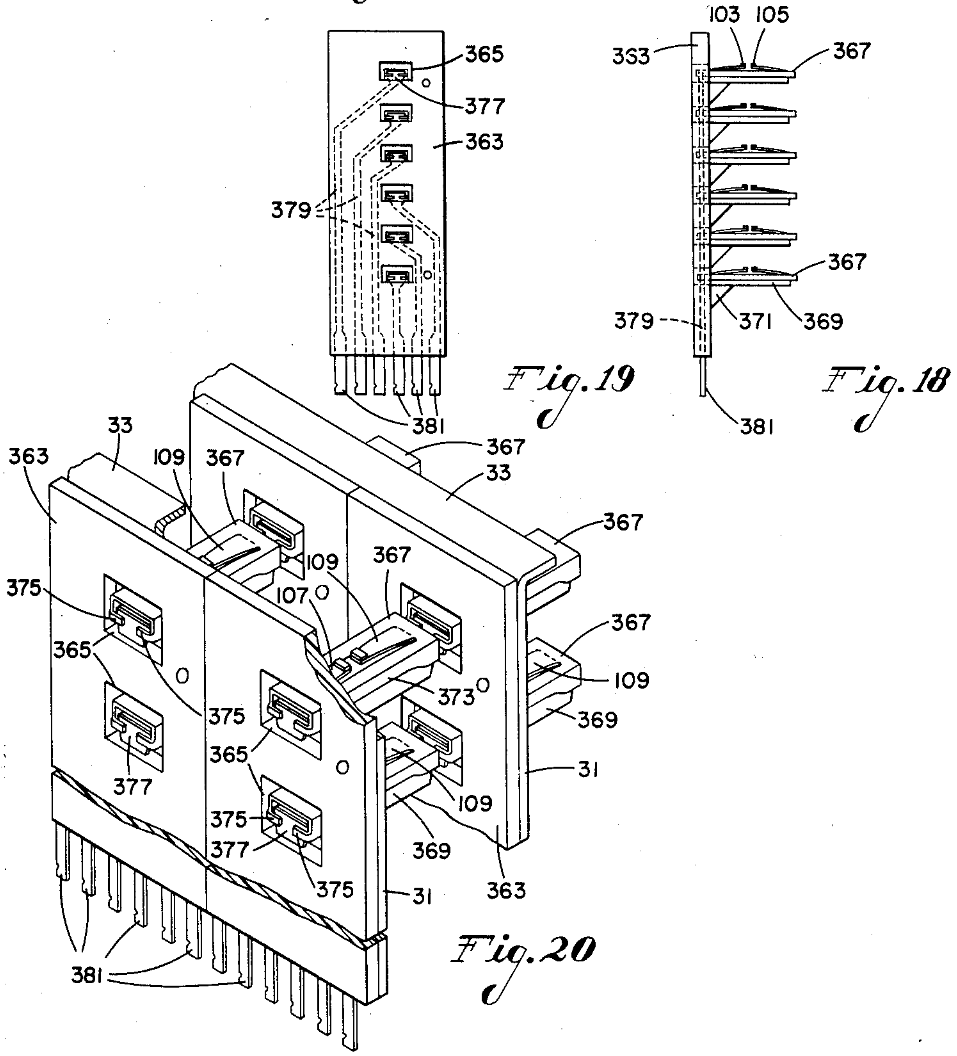

Figs. 11 to 15, inclusive, are diagrammatic views of the interposer assembly, showing various positions assumed when subjected to various stresses and displacing forces;

Fig. 16 is a perspective view of a modified form of guide for the actuator bar or hold bar;

Fig. 17 is a perspective view of a modified form of cross conductor or channel strip, especially adapted for what may be termed an individual lead-out arrangement;

Fig. 18 is a side elevation of a series of such individual lead-out cross conductors on their insulating support;

Fig. 19 is an end elevation of the same conductors, the support being in side elevation; and Fig. 20 is a fragmentary perspective view of several of the individual lead-out cross conductors together with their insulating supports and the line plates to which the supports are attached.

The same reference numerals throughout the several views indicate the same parts.

The switch structure incorporating the present invention is in the nature of an improvement on the switch structures disclosed in the present applicant's two United States patents, No. 2,731,516, granted January 17, 1956, and No. 2,729,706, granted January 3, 1956, and constituting, in turn, an improvement on the structure of Patent 2,731,516. The description of the present structure will proceed on the assumption that the reader is already familiar with the structure disclosed in said two patents and with the nomenclature employed therein.

The present structure is suitable for the same uses as the structures disclosed in said patents, and follows the same general plan of having any desired number of line conductors arranged in banks extending parallel to each other, which banks of line conductors are crossed at right angles by any desired number of what may be called cross conductors or link conductors or link bars, specifically in the form of channel strips both in the present embodiment and in the embodiments disclosed in said prior patents. Electrical contacts are made at selected points where the link conductors cross the line conductors, by moving selected portions of the line conductors to bring them into electrical contact with the link conductors. This general arrangement or general organization of the switching structure is common to the present application and to the two prior patents mentioned, but many of the details of construction as disclosed in the present application are substantial improvements over the corresponding details of the prior patents, resulting in a structure which is distinctly more rugged, durable, and reliable in operation, and more satisfactory in many ways than the structures of the two prior patents.

Figures 1, 2:
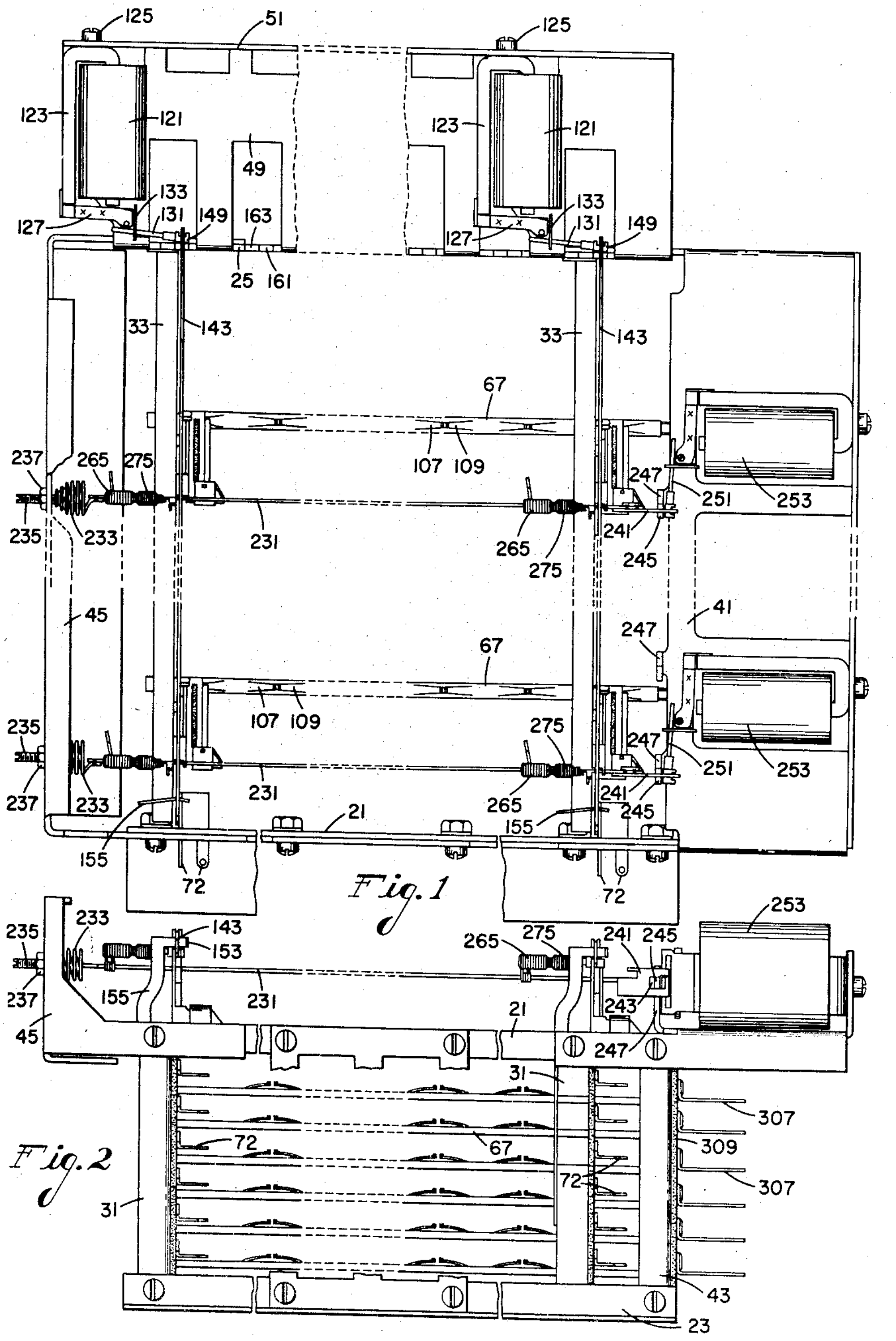
Fig. 1 is a fragmentary plan of a switch in accordance with a preferred embodiment of the present invention.
Fig. 2 is a fragmentary elevation of the same.

Referring first to Figs. 1 and 2, the main frame of the switch structure comprises horizontally extending top and bottom frame bars 21 and 23 at the front of the structure, and similar bars 25 at the rear of the structure. Any desired number of line plates 31 extend from front to rear of the structure, approximately in vertical planes arranged parallel to and spaced laterally from each other, these line plates having suitable stiffening flanges 33 (Fig. 3) extending laterally at their top edges, and similar stiffening flanges (not shown) at their bottom edges. The line plates are fastened at front and rear to the front and rear frame members 21, 23, and 25, thus serving to hold the frame members in fixed position relative to each other, while the frame members serve to hold the line plates in fixed position relative to each other.

When using expressions of direction or orientation, such as front, rear, side, top, bottom, etc., it is to be understood that such words are employed simply for convenience of description, and not by way of limitation. Actually, the switch structure may be oriented in any desired position, so that what is here described for convenience as the front may become the back or the side or the bottom, with similar changes in orientation of the other parts.

In addition to the physical connection between the front frame bars and the rear frame bars by the line plates 31, the front and rear frame bars are also connected to each other by a flange plate 41 extending from front to rear along the right hand edge of the structure, at an elevation near the top thereof, and serving as a support for the magnets which operate the selector or interposer mechanism; also by a terminal plate 43 which (except for suitable flanges at its edges) extends approximately vertically and parallel to the line plates 31; and also by a channel plate 45 having its main flange extending vertically as well as longitudinal flanges extending laterally inwardly at top and bottom, the channel 45 extending along the left edge of the structure near the top thereof and serving as a support for the left ends of the selector rods or wires.

The top frame bar 25 at the rear end of the structure is provided with a rearwardly extending horizontal flange portion 49 terminating at its rear edge in an upwardly extending flange 51, which serves to support the magnets which operate the line switching mechanism, sometimes referred to as the actuating or hold mechanism.

As already mentioned, any desired number of line plates 31 may be employed in parallel relation to each other. Only two such line plates are shown in Figs. 1 and 2, for the sake of simplicity and clarity, but ordinarily more would be employed, such as ten or twenty-five. They are called line plates, and the conductors which run along these plates are called line conductors, because in earlier forms of switches of this same general type they were designed for switching the conductor wires of telephone lines, each line plate carrying three line conductors electrically connected, respectively, to the three wires of one telephone circuit, a different line plate being used for each telephone line. However, although this nomenclature is retained for convenience, the development of the switch structure is such that the line conductors carried by the line plates of the present structure are not necessarily connected to telephone lines, but may be used for a variety of electrical switching purposes (including radio, television, and computer switching) and the present structure is not necessarily limited to three line conductors on each line plate, but may have any desired number of separate conductors within reason, six line conductors on each line plate being provided in the embodiment illustrated in Figs. 1 and 2, and more being possible. Similarly, any desired number of banks or stacks of cross conductors may be used, with a corresponding number of selector mechanisms or interposer mechanisms for selecting the particular bank of cross conductors to which the line conductors of one particular line plate are to be electrically connected. Two banks of cross conductors and two such selector mechanisms or interposer mechanisms are shown in the embodiment here illustrated, for the sake of clarity, but ordinarily there would be a greater number, such as ten banks of cross conductors or more. The number of cross conductors in each vertical stack or bank is equal to the number of line conductors in each bank thereof.

Each line plate 31 is provided with a number of openings or windows in the form of wide vertical slots 61 (Fig. 3), the number of such slots being equal to the number of banks of cross conductors which are to be employed. On one side of each line plate 31 (the left hand side when viewed as in Figs. 1 and 2, or the far side when viewed as in Fig. 3) there is fastened a plate 63 of insulating material, serving to close the window 61 except for apertures 65 formed in the insulating plate 63, which apertures are equal in number to the number of cross conductors mounted on the line plate 31, and which receive and tightly hold the cross conductors or link bars or channel strips 67 extending through these apertures approximately perpendicular to the line plates 31.

Figures 3, 4, 5:
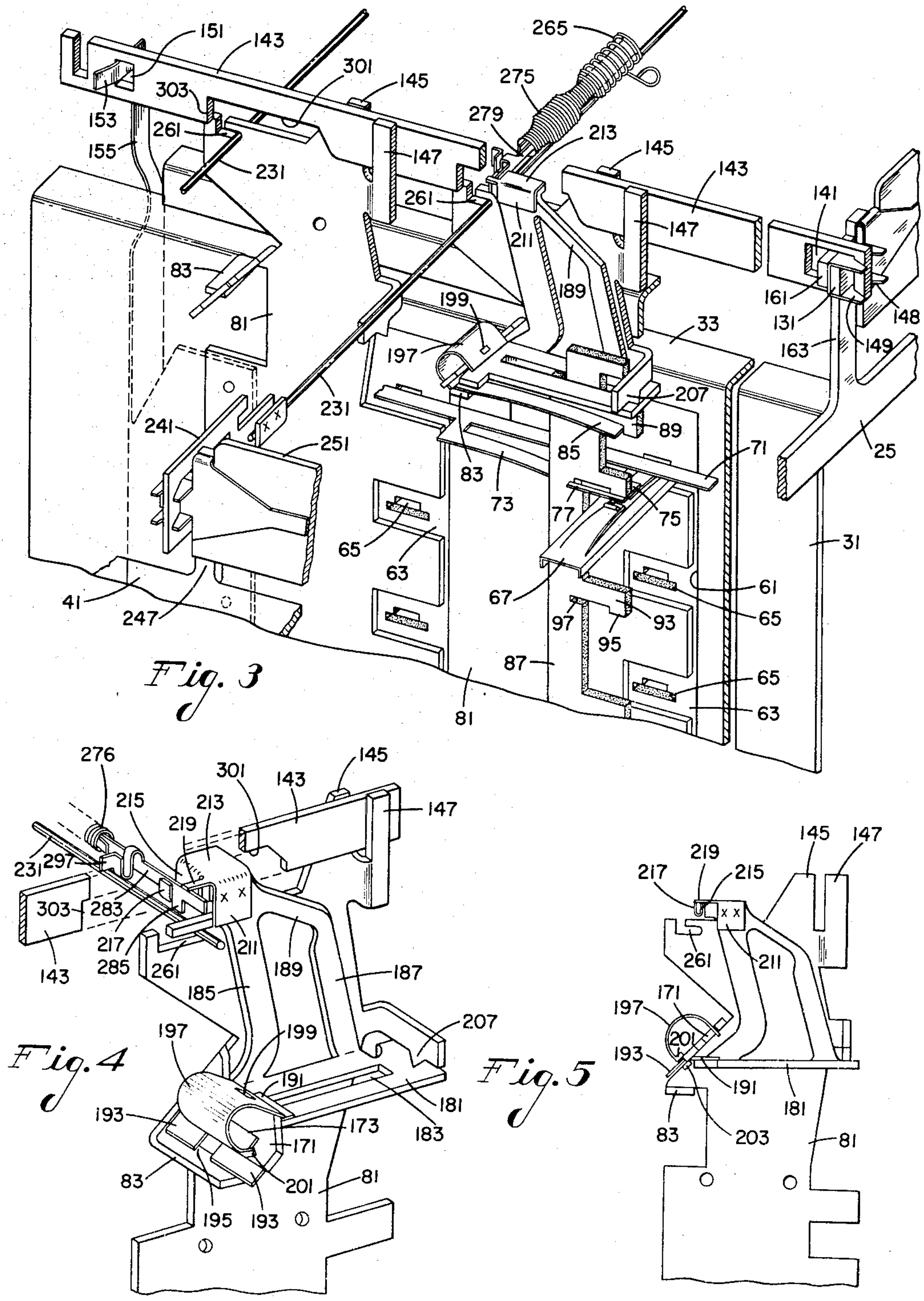
Fig. 3 is a perspective view of certain parts of the switch.
Fig. 4 is a perspective view on a larger scale of certain operating parts, particularly illustrating the rocker and its relationship to the select wire, the interposer, and the hold bar.
Fig. 5 is an elevation of certain parts shown in Fig. 4.

The line conductors extend longitudinally along the line plates 31, at elevations slightly above the respective cross conductors 67, the relationship of the parts being best seen in Fig. 3. Each line conductor comprises a continuous strip 71 of thin flexible resilient metal, suitably connected to a stationary terminal 72 (Figs. 1 and 2) at its front end and a similar terminal (not shown) at its rear end. The fastening of the ends of the line conductor 71 to the stationary terminals serves to anchor the line conductor against longitudinal movement and to hold the ends thereof in a given horizontal plane just above the tops of the cross conductors 67 which are intended to cooperate with this particular line conductor.

At various intervals throughout its length (corresponding to the intervals at which the cross conductor banks are spaced from each other) each line conductor 71 is provided with a flexible resilient arm 73 (Figs. 3 and 10) extending first laterally relative to the length of the main strip 71 and thence extending a substantial distance in a general direction parallel to the main strip 71, having a wider end 75 initially formed with a slight upward tilt relative to the arm 73, from which a reversely projecting finger 77 extends. There is one of these arms 73 for each of the cross conductors 67 with which the line conductor 71 is to make selective contact.

On the opposite face of each line plate 31 from the insulating plate 63 (that is, on the right hand face when viewed as in Figs. 1 and 2, or the near face when viewed as in Fig. 3) the line plate 31 is provided, in each space between two successive windows or slots 61, with a metal plate 81 which has parts near its top for supporting and guiding the selector mechanism and the contact closing mechanism, as further described below, and which also has a lateral projection 83 near its top and a similar lateral projection (not shown) near its bottom, on each of which lateral lugs there is fastened a leaf spring 85 of resilient metal, longitudinally slotted to receive in the slot thereof a pusher 87 formed of stiff insulating material and having a hook 89 extending over the free end of the spring 85, and a similar hook (not shown) extending over the free end of the similar spring at the bottom of the structure. By means of these hooks extending over the springs, the top and bottom ends of the pusher 87 are supported and guided, and the springs tend to raise the pusher to its uppermost position, but the pusher is capable of limited vertical downward movement, flexing the springs. Since the springs are flexible vertically but not horizontally, they serve not only as supports but also as guides accurately holding the pushers in alinement and preventing lateral displacement thereof.

Each pusher 87 extends vertically through the slot 91 (Fig. 10) between the main spring arm 73 and the finger 77 of the line conductor, whereby the line conductor is guided against lateral shifting out of proper alinement because the pusher 87 itself is held against lateral movement by its supporting leaf springs and also by its rocker as explained below. Each pusher 87 has, at an elevation just above each of the line condutors 71, a projecting lug 93 having a downwardly faced foot 95, and also a horizontal slot 97 extending part away through the main body of the pusher 87 just at the bottom edge of each lug 93, all as best seen in Fig. 3. The foot 95 overlies the right hand end of the wide portion 75 of the line conductor, while the left end of the portion 75 is engaged in the slot 97. When the line conductor 71 is initially formed from resilient sheet metal, it is formed, as already mentioned, with a slight upward bend along the dotted line 99 (Fig. 10) where the wider portion 75 joins the main length of the spring 73, so that the wide end 75 tends to tilt upwardly. The cooperating parts of the foot 95 and slot 97 in the pusher 87 thus serve to keep the metal conductor parts under a slight degree of resilient deflection or tightness, because the rear end (right end as in Fig. 10) of the part 75 is pressed downwardly by the foot 95 while the front end of the part 75 is held up by the lower face of the slot 97, thereby tending to hold this wide portion 75 horizontal as distinguished from its resilient tendency to tilt slightly upwardly. In this way, each portion 75 of each line conductor 71 has at all times a firm connection with its pusher 87, avoiding undesirable looseness of the parts and holding them firmly so that the switch will operate properly in any position of orientation, whether upside down, right side up, or inclined, and whether or not it is subjected to vibration, as for example when mounted on a moving vehicle or when mounted near vibrating machinery.

The under side of each portion 75 of the line strip or line conductor is provided with a contact member 101 firmly secured, as by welding, to the member 75 and extending in a general direction crosswise to the length of the conductor 71 and the length of the line plate 31 on which this conductor is mounted. When the portion 75 is slightly depressed (by downward movement of the pusher 87) from its normal elevation, the flat bottom face of the contact member 101 comes down against the flat top surfaces of and makes electrical contact with two contact members 103 and 105 (Figs. 3 and 9) suitably secured, as by welding, to the top surfaces of respective spring tongues 107 and 109 formed on the cross conductor or link bar 67.

In the preferred construction, the two tongues 107 and 109 are formed integrally from the main flange or base flange of the channel bar 67. The channel bar itself is made of beryllium copper, rather than from nickel silver as used in earlier forms. In a first punching operation, only the side edges of the tongues are sheared from the base flange of the channel, and the two tongues 107 and 109 together (not yet cut apart) are arched upwardly out of the plane of the base flange. Then the channel is heat treated to harden the metal to the desired degree. For example, the channel may be heated to approximately 700° F. and held at this temperature for approximately one hour, then being allowed to cool slowly, in air, to room temperature. Any known form of heat treatment of beryllium copper may be employed, either in addition to or as a substitute for the specific treatment mentioned above as an example, the point of this phase of the invention being that the heat treatment (whatever its exact nature) takes place while the two tongues 107 and 109 are still integrally connected endwise to each other and form parts of a single curved member or arch which at both ends is integral with the man flange or base flange of the channel.

This arched formation is inherently stable, so that these parts maintain, during heat treatment, the correct shape to which they were formed during the first punching operation. Experience shows that if the two tongues were cut apart before the heat treatment, so that each was supported only in cantilever fashion, there is great likelihood of warping or distortion during the heat treatment, unless held in place by jigs or fixtures. Any such distortion is extremely undesirable in electrical switch parts such as these, where the parts must be held in position to close tolerances, to permit relatively movable members to make proper contact with each other when the switch is to be closed by a slight movement, and to prevent false closing or false contact when the switch is intended to be open. The integral arched formation, during the heat treating step, holds the spring fingers in the desired position, without the need for jigs. The heat treatment relieves the stresses set up in the metal during the punching and forming step. Then when the heat treatment is finished, the channel is subjected to a second punching operation, to cut the two tongues 107 and 109 apart from each other at the center of the arch and to cut out a slight amount of metal at this point so that the two tongues can move up and down independently without rubbing endwise on each other.

The use of beryllium copper rather than nickel silver provides better electrical conductivity, increased spring stability, and increased ruggedness and reliability both in assembly and in operation or performance.

The contact members 103 and 105 are elongated in a direction transverse to the length of the channel 67 and parallel to the length of the adjacent line plate and line conductor. Thus these two contact members lie at right angles to the length of the contact member 101 on the line conductor. When the portion 75 of the line conductor is at its normal elevation, the contact member 101 is spaced slightly above the normal elevation of the contact members 103 and 105, so that the switch at this point is open. When the portion 75 of the line conductor is slightly depressed (by downward movement of the insulating pusher 87 as further explained below) the contact member 101 is brought down firmly against the top surfaces of both of the contacts 103 and 105 on the cross conductor, making firm electric contact with both of them and thus closing the switch at this point to connect the line conductor 71 electrically with the cross conductor 67. The use of two contact members 103 and 105, mounted for independent resilient movement on their respective tongues 107 and 109, makes the switch closing contacts more reliable and certain, as a speck of dust on one of the contact members 103 or 105 would not prevent the other from making proper contact with the member 101, and either one of the contacts alone will be sufficient for practical purposes.

The contact members 101, 103, and 105 are preferably made of palladium, which gives long life in make-and-break contacts. The line conductors 71 may be made of either nickel silver alloy or beryllium copper (preferably the latter) while the channel strips 67 are of beryllium copper as above explained. In prior cross bar switches, it has been customary to make the contact members of palladium backed up by a cheaper metal such as a piece of nickel silver constituting, with the palladium, a bimetallic strip welded as a unit to the conductor, this bimetallic strip being necessary in the prior construction in order to secure enough height to insure good contact and proper operation. It will be noted in Fig. 1 of my Patent 2,729,706 that the contact carrying tongues 9*c* of the cross conductor or channel bar 9 are flat tongues lying in the same plane as the main base flange 9*a* of the channel bar, and the same construction is present in my prior Patent 2,731,516, as shown in Fig. 5 thereof. Because of this construction, the contact members 9*d* of said Patent 2,729,706 and the corresponding contact members 11*d* in said Patent 2,731,516 had to be built up to a substantial height, to insure satisfactory contact. But in the new construction of this present application, the contact members 103 and 105 are carried by the spring tongues 107 and 109 which themselves incline upwardly from the plane of the normal top surface of the cross conductor 67, so it is no longer necessary to make the contact members themselves so thick, with consequent saving of expense because of the ability to use thinner contact members of palladium only, rather than thicker members of palladium backed up by nickel silver alloy.

Another noteworthy point of improvement is that all three of the contact members, in addition to being thinner than those previously used, may also be shorter. This is because the present construction guides the various movable parts more accurately, with smaller tolerances of possible variation in position, whereby less overlap to take care of manufacturing tolerances is needed. The two contact members 103 and 105 are brought considerably closer together than the corresponding contacts in my prior patents above mentioned. Since the portion 75 of the line conductor, which carries the contact member 101, is anchored quite securely to the pusher 87, and since the pusher in turn is guided quite accurately in its up and down movements, this construction presents undesired variations in the position of the contact member 101 in the direction of its length (that is, in a direction perpendicular to the line plate 31 on which it is mounted) so that the contact member 101 can be made only long enough to extend adequately over the top surfaces of the contact members 103 and 105 with which it is to mate, with very little extra allowance for tolerance. Similarly, the position of the contact 101 in a direction parallel to the line plate is carefully controlled by the same construction, and the tolerance of possible displacement in a direction parallel to the line plate is very small, so that the contact members 103 and 105 can be made quite short in a direction parallel to the line plate.

The present switch incorporates the same general arrangement used in the prior switches of my prior patents above mentioned, of having an actuator associated with each line plate and capable of causing downward movement of any selected one of the various pushers mounted on that line plate, together with a selector mechanism associated with each row or bank of cross conductors or link conductors, for selecting the particular pusher of the line plate which is to be moved when the actuator of that line plate is operated. However, both the actuator mechanism and the selector mechanism of the present invention are quite different from and substantially improved over the corresponding mechanisms of my said prior patents. The actuator mechanism will first be described, this being sometimes called the hold mechanism because it serves not only to move the selected one of the pushers 87 downwardly, to close the selected row or bank or contacts, but also to hold this pusher in its down position to maintain the row or bank of switches in closed condition, so long as may be desired.

The present actuator mechanism comprises, for each separate line plate 31, a line magnet (Fig. 1) comprising a coil 121 wound on one leg of a U-shaped core 123 secured by a screw 125 to the upstanding flange 51 of the stationary plate 49 which extends along the rear edge of the frame of the switch mechanism. The magnet has an armature 127 hinged by a flexible metallic hinge to the free leg of the core 123, and having normally a quite small air gap with respect to the pole face of the other leg on which the coil 121 is wound, when the coil is not energized. When the coil is energized, the armature 127 is attracted into contact with the pole face, with very great force because of the small air gap, the distance of travel of the armature being quite small, however, in order to secure this small air gap and consequent great force. To increase the distance of travel, a leverage system is employed, comprising a motion-increasing lever 131, one end of which (the left end when viewed as in Fig. 1) is fulcrumed against a fixed fulcrum, while an intermediate part of the lever is fulcrumed on a yoke 133 carried by the free end or moving end of the armature 127. The free end (or right hand end when viewed as in Fig. 1) of the motion-increasing lever 131 thus moves through a considerably longer stroke or range of travel than the free end of the armature 127.

The construction of the magnet and of the motion-increasing leverage or linkage is substantially the same as that disclosed in the copending United States patent application of Andrew W. Vincent, Serial No. 405,797, filed January 25, 1954, except that the motion-increasing lever extends in the present case in the opposite direction from that in which it extends in said copending application.

At its free end, the motion-increasing lever 131 enters an opening 141 (Fig. 3) at the rear end of an actuator bar or hold bar 143 formed of relatively rigid metal and extending along the top of the line plate 31. In the construction shown in Figs. 3–5, the bar 143 is guided for limited longitudinal movement by upstanding guide posts 145 engaging one side and 147 engaging the opposite side of the bar 143, one of each of these posts being formed on each of the plates 81, so that the actuator bar 143 is guided at a number of different points along its length. Preferably, however, instead of this construction the bar 143 is guided by the construction shown in Fig. 16, where each plate 81 has an upstanding ear 144 lying in a plane perpendicular to the length of the bar 143. Riveted to the ear 144 is a small plate 146 of nylon plastic, having a guide slot to receive the bar 143. The nylon plastic provides a low-friction and non-abrading guide for the bar 143, holding it out of contact with the metal of the ear 144. The rear end of the slot 141 in the bar 143 has what may be called a rolling contact on the magnet arm or lever 131, and the bar 143 is held against lateral movement on the lever by V-shaped notches 148 in rearwardly extending top and bottom flanges of a sheet metal clip 149 welded to the lever 131.

At its front end (the left end when viewed as in Fig. 3) each actuator bar 143 has a small opening 151 in which is received the laterally extending end of lug 153 on an upstanding leaf spring member 155 (Figs. 2 and 3) secured to the line plate 31 near the front end thereof. This spring serves to draw the bar 143 resiliently forwardly, in a direction away from its magnet 121, and holds the rear end of the bar constantly in firm engagement with the magnet lever 131, so that there is no looseness between these parts and no opportunity for undesired impact between the parts when the magnet is energized.

The opening 141 at the rear end of the bar 143 (right hand end when viewed as in Fig. 3) receives not only the free end of the lever 131, as already mentioned, but also a stationary ear 161 extending laterally into this opening from the upper end of an upstanding rigid post 163 formed on the stationary frame bar 25. The stationary ear 161 at the rear end and the spring ear 153 at the front end of each actuator bar 143, serve to hold the bar at the desired elevation. This is sufficient to determine the elevation of the entire length of the bar, within practical limits, as there is considerable tolerance in the vertical position of the bar 143 at points intermediate its ends. The stroke or extent of longitudinal movement of the bar 143, when the magnet coil 121 is energized, should be controlled within relatively close tolerances, however, and this is done by proper formation of the length of the opening 141 which is engaged by the lever 131 and the fixed lug 161. In a forward direction, the bar 143 cannot move any farther than the position in which the lever 131 lies firmly against the rear face of the lug 161 or other appropriate parts of the stationary post 163. When the magnet is energized to draw the bar 143 rearwardly, it can move no further rearwardly than the point where the front edge of the opening 141 engages the front face of the lug 161.

Through suitable interposers or selectors and suitable rockers to be described below, the longitudinal rearward movement of the actuator bar or hold bar 143 will depress a selected one of the pushers 87, thus pushing down the entire vertical bank or stack of the contact portions 75 and 101 of all of the line conductors which are in line with the particular pusher 87 which is actuated, so as to make contact with the cross conductors 67 in the selected stack or bank. In the prior patents above mentioned, the actuator for moving the selected pushers downwardly was in the form of a torsion shaft operated by energization of its line magnet. Due to torsional deflection under load it was found, however, that this prior arrangement did not always move all of the pushers to the same extent, because the torsional deflection of the actuator was greater when actuating a pusher farther from the magnet, than when actuating a pusher closer to the magnet. This resulted in difficulties in adjusting the switch mechanism. In the present construction, where the actuating member is in the form of a tension bar moved longitudinally rather than in the form of a torsion shaft which is rotated, the deflection under load is negligible, with the result of greatly improved operation because each pusher selected for actuation is moved to the same extent, regardless of the distance of this pusher from the actuating magnet. It is necessary, however, to provide rockers to translate the horizontal movement of the actuator bar 143 into a vertical downward movement of the pusher 87, which rockers were not necessary in the construction shown in my prior patents because downward movement of a pusher could be secured directly from a radial arm on the torsion shaft.

The construction of the rockers is best seen in Figs. 3, 4, and 5. As already explained, there is a metal plate 81 secured to the line plate 31 near each vertical row or bank of cross conductors 67, which plate 81 projects upwardly beyond the top of the line plate 31. In addition to the previously mentioned guide lugs 145 and 147 (or parts 144, 146) and spring mounting lug 83, the upper part of each plate 81 also carries a lateral lug 171 located a little above the lug 83 and inclined from front to rear at an angle of about 45 degrees to the horizontal, as seen in Fig. 5. The lower edge of this lug 171 is centrally notched out at 173, the lug extending somewhat further downwardly at its right and left ends at both sides of the notch 173.

On this lug 171 there is pivotally mounted the element herein called a rocker, which is in effect a bellcrank lever having an upstanding arm for receiving motion from the actuator bar 143, and an approximately horizontal arm overlying a portion of the pusher 87 to move the pusher downwardly. The rocker is made from a formed up piece of sheet metal, having the shape best shown in Figs. 3, 4, and 5, including a main or bottom flange 181 longitudinally slotted at 183 through part of its length, with both ends of the slot closed. Integral with this flange 181 and rising from one edge thereof (the left edge or edge nearest the plate 81 and the line plate 31) are two upstanding portions, one of them 185 being near the hinge end of the main flange 181, and the other 187 being near the free end of the main flange. The upper end of the part 187 is connected to the upper end of the part 185 by an integral connecting strip 189 of considerably reduced cross section as compared with the cross section of the parts 185 and 187, purposely made sufficiently small so that a bending tool can be applied to the part 189 after the rocker is installed in the switch structure, for bending this part slightly one way or the other as an initial installation adjustment, to vary slightly the angular relationship between the main flange 181 and the effective coupling surface or motion transmitting surface at the upper end of the part 185.

The hinge mounting of the rocker on the lug 171 is an important feature in promoting long life and reliable action of the switch mechanism. To be commercially feasible, the switch should be capable of several million actuations without any malfunctioning. During any such large number of operations, a pivotal hinge of the usual type is likely to wear to such an extent as to have undesirable looseness and may cause faulty operation. The present hinge has no pivot pin, but has, instead of a pivot pin, two parts in what may be termed rolling contact with each other, always pressing against each other but rolling without any sliding or slipping of one on the other, thereby having a long life capable of millions of operations without appreciable wear.

To this end, the hinge end of the flange 181 of the rocker has welded to its upper surface one arm 191 of a clip made of thin and hard sheet metal, substantially thinner than the flange 181 of the rocker as well seen in Fig. 5. The second arm of the clip is indicated at 193 and is formed at approximately 45 degrees to the arm 191, and is of approximately T-shape with a central notch 195 cut out of the middle of the T as seen in Fig. 4. The upper edges of the cross bar of the T portion 193 rest against the lower edges of the fixed lug 171 and form a rocking fulcrum thereon. A spring clip 197 of approximately semi-cylindrical shape has at one end a small opening 199 engaged over a small tit or protuberance on the upper end of the stationary lug 171, to prevent displacement at this end of the spring. The lower end of the spring 197 has a central portion which extends through the notch 195 of the hinge member 191, 193, and lateral ears 201 and 203 lying respectively above and below the cross bar portion or T-head portion 193 of the angular hinge member. These ears 201 and 203 are at an angle to the rolling contact edge of the hinge, as seen in Fig. 4.

The engagement of part of the spring in the notch 195 of the angular hinge member 191, 193 prevents the spring from moving laterally relative to the hinge member, while the ears 201 and 203 prevent this end of the spring from moving in directions perpendicular to the T-head portion 193. The angle member 191, 193 itself cannot shift laterally due to part of this member lying in the notch 173 of the fixed lug 171, which closely confines the hinge member without being so tight as to prevent easy movement thereof. The effect of all this is that the spring 197 tends to draw the T-head 193 of the angle plate obliquely upwardly toward the lug 171, keeping the upper edge of the crossbar of the T 193 in firm contact with the lug 171, but capable of turning by a rolling action on the fixed lower edge of the lug 171 as a fulcrum, the thickness of the fixed lug being considerably more than the thickness of the member 193. The pusher springs 85 exert upward force tending to move the free end of the flange 181 of the rocker upwardly, to an extent limited by contact of this end with a fixed stop 207 formed as an integral laterally bent lug on the plate 81. The pusher 87 extends upwardly through the slot 183 in the rocker flanges 181, as seen in Fig. 3, and is held in alinement by close engagement with the sides of this slot as well as by close engagement with the sides of the slots through which it extends in the supporting springs 85 at top and bottom of the rocker, as previously mentioned. The same extension 89 on the pusher 87 which forms the hook engaging over the upper spring 85, has its top surface engaged against the under face of the free end of the rocker flange 181, so that the fixed stop 207 determines not only the upper position of the rocker flange 181 but also the upper position of the pusher 87, and any downward swinging movement of the rocker flange 181 will cause corresponding downward movement of the pusher 87.

The effective pressure surface or force transmitting surface at the upper end of the rocker, for receiving motion from the longitudinal stroke of the actuating bar 143 (when the interposer of the selector mechanism is in effective position) is made of sheet metal thinner than that from which the main parts of the rocker itself are made, formed up to provide a clip having a side flange 211 welded to one face of the upstanding lug 185 of the rocker near the top thereof, and a top flange 213 extending approximately horizontally over the top of the rocker. A front flange 215 is bent downwardly from the front edge of the top flange 213, and extends a short distance down the front of the rocker, and then is bent into a U-shape and extends upwardly again at 217, leaving a space between the parts 215 and 217 for the reception of a guide arm on the interposer, as further described below. A small flange or lug 219 extending approximately horizontally forwardly from the right front corner of the top flange 213 overlies the guide arm of the interposer and serves to retain it in place in the guide opening between the parts 215 and 217, as best seen in Fig. 4.

It will now be apparent that if horizontal pressure in a rearward direction is exerted against the approximately vertical face 215 of the rocker assembly, this will rock the rocker on its hinge 193, will depress the rear or free end of the horizontal flange 181 of the rocker, and will carry the pusher 87 down with it, against the upward force of the upper pusher spring 85 and the corresponding lower pusher spring and the slight upward force caused by the spring 197. This downward movement of the pusher 87 will bring all of the line contacts of the particular vertical stack or bank associated with this particular pusher, down onto the contacts of the cross conductors in this particular vertical stack or bank.

The selector mechanism serves to select or determine the particular rocker or rockers to be actuated by the longitudinal movement of the actuator bar or hold bar 143. This selector mechanism is, in general purpose or function, quite similar to, but in details of construction quite different from, the selector mechanism in my said prior patents.

Extending across the switch structure, near the top thereof, are a number of selector wires or rods 231 equal in number to the number of vertical stacks or banks of cross conductors, one such selector wire being for use with each individual stack of cross conductors. At its left end, each selector wire 231 is anchored to a coil tension spring 233 (Figs. 1, 2, and 8) the left end of which spring is formed conically as shown and embraces tightly over a conical head on an adjusting screw 235 threaded through a vertical flange of the stationary frame member 45 and held in adjusted position by a lock nut 237.

The opposite or right hand end of each selector wire 231 is welded or otherwise fixed to a sheet metal clip 241 (Fig. 2) lying in an approximately vertical plane and having a rectangular hole 243 engaged over a stationary lug 245 of an upstanding stationary post 247 formed on the stationary frame part 41. The same opening 243 in the sheet metal clip also receives the free end of the motion-increasing lever 251 of the selector magnet 253, there being one magnet for each separate selector wire 231. These magnets are mounted on the stationary frame 41, and may be of exactly the same construction as the actuating magnets 121 together with their operating parts such as the armatures and motion-increasing levers thereon. Thus when any one of the selector magnets 253 is energized, this will operate the motion-increasing lever 251 thereof to pull the selector wire 231 connected with that particular magnet, against the force of the return spring 233, the extent of longitudinal travel of the selector wire being accurately controlled by the size of the opening 243, just as the length of travel of the actuating bars 143 is limited by the size of the opening 141 therein.

Figures 6, 7, 8, 9, 10, 11, 12, 13, 14, 15:
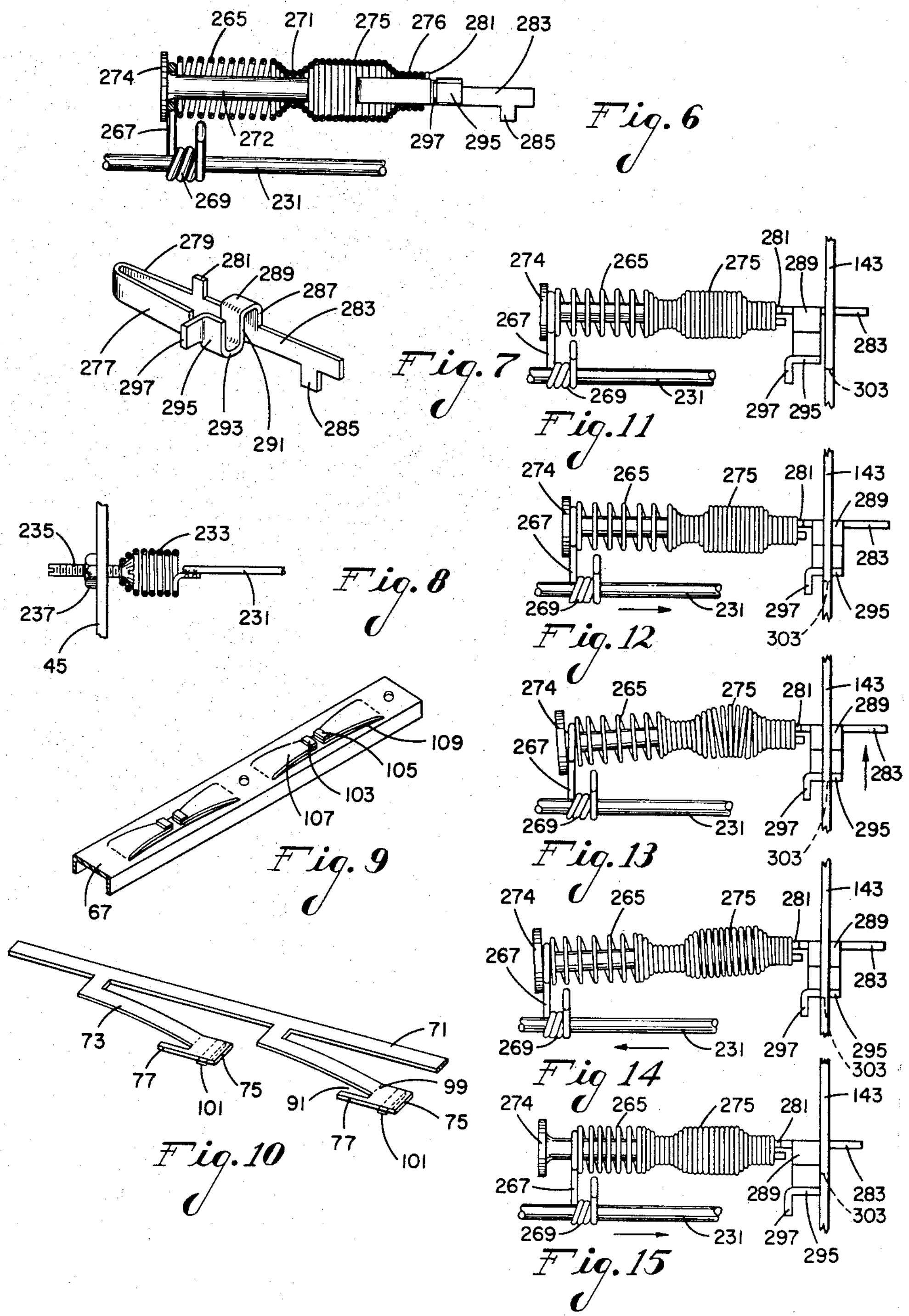
Fig. 6 is a view partly in elevation and partly in vertical section, of the interposer assembly.
Fig. 7 is a perspective view of an interposer member.
Fig. 8 is a view partly in plan and partly in longitudinal section of a select wire return spring and the adjusting screw thereof, including fragments of the select wire and the frame or mounting plate.
Fig. 9 is a perspective view of a portion of the channel strip or link bar or cross conductor.
Fig. 10 is a perspective view of a portion of the line strip or line conductor.

Mounted on each selector wire 231 are several interposer assemblies, one for each line plate 31. Thus if the switch structure includes ten line plates, there will be ten interposer assemblies on each of the several selector wires 231. The construction of each interposer assembly will be best understood from Figs. 3, 6, and 7, showing the mechanical details, together with the diagrammatic views constituting Figs. 11 to 15, illustrating the principles of operation.

Each selector wire 231 is guided in a horizontal slot 261 formed in the upper portion of each plate 81 and opening upwardly at its forward end to the top edge of the plate 81, so that the wire 231 may be placed in the guide slots 261 by dropping it down into one end of each slot. A little to the left of each plate 81 and its associated actuating bar 143, in the space between this bar and the next adjacent actuating bar of the next adjacent line plate, there is an actuator assembly comprising a first coiled spring portion 265, and a supporting portion 267 which is wrapped tightly at one end around the selector wire 231 for several turns as shown at 269, and which has an eye at the other end for encircling and supporting the guide rod 272 of the spring 265. The wrapping 269 is sufficiently tight on the wire or rod 231 to prevent any movement, either rotational or longitudinal.

The coils of the spring section 265 are slightly separated from each other in their relaxed condition, so that, under compressive force, the spring is capable of shortening. At the right end of this spring section 265, the coils thereof are necked down at 271 to a smaller diameter, which grips tightly on the right end of a guide rod 272 which passes loosely and slidably through the eye in the support wire 267. This rod 272 is of considerably less diameter than the internal diameter of the spring 265, so it does not interfere with lateral flexing of the spring, but it has an enlarged head 274 at its left end, normally held tightly at the left end of the spring 265 to limit the extent to which the spring can expand longitudinally. To the right of the neck portion 271, the coils of the spring wire are flared out again to form a second spring section 275 of approximately the same diameter and roughly the same length as the section 265, but the section 275 is wound under initial tension with successive coils tight against each other so that this section or part of the spring cannot compress but it can expand longitudinally. The right end of the section 275 is necked down again at 276 to a neck of substantial length, which receives and frictionally retains the legs 277 and 279 (see Fig. 7) of the U-shaped interposer itself, formed up from a piece of sheet metal. The necked portion 276 of the spring and the U-shaped leg portion 277, 279 of the interposer are of such size relative to each other that the legs of the interposer fit snugly into the neck of the spring and are firmly held therein. An upstanding lug 281 on the interposer serves as an abutment or stop to limit the extent to which the interposer legs can be thrust into the spring during initial assembly or as a result of forces exerted during actual operation.

A guide strip portion 283 of the interposer extends forwardly as an integral extension of the leg 279 thereof, and when the device is assembled, this guide portion 283 extends through the slot or space between the portions 215 and 217 of the rocker, as shown in Fig. 4, thus serving as an alinement guide to keep the interposer properly alined with the rocker. A downwardly extending ear 285 formed on the portion 283 near its right hand end serves as a stop or abutment to limit the extent to which the interposer can be withdrawn leftwardly from the rocker, preventing complete disengagement.

The actual contact part or force transmitting part of the interposer is of somewhat S-shaped construction, which is found very advantageous. Referring especially to Fig. 7, this force transmitting part first rises upwardly from the guide portion 283 as shown at 287, then is bent to extend forwardly as at 289, then extends downwardly as at 291, then forwardly again at 293, and finally upwardly again at 295. When viewed from the right hand end, its shape is somewhat like that of the letter S laid on its side. The final portion 295 also has an abutment ear 297 extending forwardly from the left edge of the portion 295, to engage against the left side of the actuating bar 143 when the interposer is moved rightwardly into effective position, to limit the extent of such rightward movement, and to make sure that the interposer is properly positioned for effective operation. As the interposer is moved rightwardly, the first loop of the S portion (between the parts 287 and 291) slides over and receives the guide lug 217 on the rocker, so that this lug does not interfere with the motion of the interposer to and from its effective position.

The bottom edge of each actuating bar 143 is notched as at 301 (Figs. 3 and 4) in the vicinity of each rocker. The forward end 303 of such notch constitutes the abutment surface or force transmitting part of the actuating bar 143, for moving the selected rocker from the longitudinal movement of the actuating bar. In the normal rest position of the parts, the interposer is withdrawn to the position shown in Fig. 4, that is, the interposer together with its supporting wire or rod 231 is at the leftward limit of its travel, and only the thin guide part 283 of the interposer lies between the abutment surface 303 of the actuating bar 143 and the abutment surface 215 of the rocker. This thin guide part 283 is not sufficiently thick to fill the space between the parts 215 and 303, even when the bar 143 has been fully actuated, so no motion of the rocker is produced when the actuating bar 143 is pulled rearwardly by its magnet 121.

However, when one of the magnets 253 is energized to draw its selector wire 231 rightwardly, all the interposers mounted on this selector wire are moved rightwardly so that the thick or S-shaped part 287—295 of the interposer is brought opposite the part 215 of the rocker, between it and the abutment surface 303 of the actuating bar. This thick S-shaped part or force transmitting part of the interposer almost fills the space between the members 215 and 303, when the actuating bar 143 is in its relaxed or forward position. Therefore, while the interposer is held in this effective position, a longitudinal rearward stroke of the actuating bar 143, caused by energization of its magnet 121, will cause the shoulder or abutment surface 303 of the actuating bar to push rearwardly against the part 295 of the interposer, transmitting force to the S-shaped part thereof so that the part 287 of the interposer will in turn press rearwardly against the part 215 of the rocker, and swing the rocker on its hinge so that the rear end of the rocker flange 181 is depressed to cause downward movement of the pusher 87, to close the vertical stack or bank of switches at this particular crossing point.

When one of the magnets 121 is energized, its connected actuating bar 143 is moved with great force and at great velocity. In order to absorb the sudden impact forces thus produced at high velocity, the S-shaped formation of the parts 287—295 of the interposer is found to be quite effective. There is just enough resilient spring action in this S-shaped part to absorb the sudden violent impact produced by the quick movement of the actuating bar, without damage to the rocker and parts moved thereby, while at the same time the interposer maintains its dimensions sufficiently well so that the extent of movement of the rocker is the same at each actuation.

For satisfactory operation, the interposer mounting must normally hold the interposer accurately in predetermined position relative to the wire 231 on which the interposer is mounted, so that when this wire is moved longitudinally by its magnet 253, the interposer will always be properly moved to its effective operating position, without fail. But at the same time, the mounting of the interposer must have great flexibility, in order that the interposer, when in effective position, may easily move in the intended manner with the actuating bar 143, without causing any undue resistance to the movement of the actuating bar, and also in order that, when the magnet 253 of the interposer wire is deenergized while the magnet 121 of the actuating bar remains energized, the interposer mounting wire 231 can return leftwardly to its normal rest position without accidentally withdrawing the interposer which has meanwhile been caught and clamped in its actuated position between the parts 215 and 303. In addition to flexibility required by these considerations, flexibility is also required in order to prevent undue strain on the parts when an interposer wire is moved rightwardly to select a particular bank of cross switches, while one or more of the actuating bars 143 have already been actuated to close certain switches and are still held in actuated position.

Such flexibility, coupled with the desired close tolerance or uniformity of position in normal operation, is well performed by the particular interposer structure disclosed. The spring section 265 can compress longitudinally but not expand beyond the normal fully expanded position determined by the head 274 on the stud 272. The spring portion 275 cannot compress any further than its normal compressed condition, but it can expand longitudinally. Both spring portions 265 and 275 are flexible in transverse directions, but normally maintain longitudinal alinement in the absence of transverse displacing forces.

Some of the conditions met in operation of the interposer mechanism, are illustrated diagrammatically in Figs. 11 to 15, to which reference is now made. For convenience of illustration, these diagrams show the supporting wire 231 to one side of the interposer springs, but actually the supporting wire is directly below the interposer springs, as indicated in Figs. 2 and 3.

Fig. 11 illustrates the position of the parts in normal rest position, the actuating bar 143 being in its normal forward position (its magnet 121 not energized) and the selector wire 231 which carries the interposer assembly being in its normal leftward position (its magnet 253 being not energized). The thick S-shaped portion or effective portion of the interposer is not in line with the actuating bar 143, so even if the actuating bar is actuated, no motion will be transmitted to the rocker at this particular crossing point.

Fig. 12 shows diagrammatically the condition when the selector wire 231 has been actuated by energization of its magnet 253, but before the actuating bar 143 has been actuated by energization of its magnet 121. In this condition, the wire 231 has been moved rightwardly, placing the thick part of the interposer in line with the actuating bar 143, between the shoulder 303 thereof and the portion 215 of the rocker, ready to transmit motion or force. But at this time the actuating bar has not yet been moved longitudinally. Consequently, up to this point, the motion of the interposer assembly is a straight longitudinal motion in a direction parallel to the wire 231 (crosswise to the switch structure as a whole, when viewed as in Figs. 1 and 2) and there has been no lateral flexure of the spring portions 265 and 275, nor any longitudinal compression or expansion of either spring portion.

The next step is the actuation of the bar 143 by energization of its magnet 121, while the wire 231 still remains in its rightward position. This is shown in Fig. 13. The movement of the bar 143 in a lengthwise direction (rearwardly when viewed as in Figs. 1 and 13) causes the shoulder or abutment surface 303 on the actuating bar to move the thick S-shaped part of the interposer bodily rearwardly, to cause corresponding rearward movement of the top of the rocker. Since the left end of the interposer spring is anchored to the wire 231 which remains stationary at this moment, and since the right end of the interposer spring must move rearwardly (transverse to the length of the spring) with the interposer itself, it follows that the spring portions 265 and 267 are flexed laterally as indicated in Fig. 13, to accommodate this rearward shift of the interposer.

The next step in normal operation is the release of the selector wire or interposer wire 231, so that its spring 233 draws it leftwardly to its normal rest position, while the bar 143 still remains in its actuated position and may be held in this actuated position for a longer or shorter interval, depending on how long it is desired to keep the switches closed at this particular crossing point. This next step is illustrated in Fig. 14, where the wire 231 has returned leftwardly but the actuating bar 143 remains in its actuated rearward position, thus tightly clamping the interposer so that it cannot return, and of course should not return or be released from the rocker so long as the switches at this point are to remain closed. Upon this return movement of the wire 231, the interposer spring part 265 cannot stretch or elongate because such elongation is prevented by the stud 272 and head 274 thereof. However, the spring part 275 can and does elongate sufficiently to permit the return of the wire 231 without withdrawing the interposer from the rocker. Whenever the actuating bar 143 is later released, the release of clamping pressure on the interposer will permit the spring 275 to contract and pull the interposer back again to its normal rest position.

Another possible condition is illustrated in Fig. 15. This is when the particular actuator bar 143 under consideration has already been actuated in connection with the operation of a different one of the selector wires 231, and is still held in actuated position, while now another selector wire 231 (the one shown in Fig. 15) is actuated to perform another selecting operation for use, of course, with a different actuating bar, not the one here shown. So in Fig. 15 the selector wire or interposer wire 231 is shown actuated to its rightward position, but the interposer now cannot move into alinement with the bar 143 because this bar has already been moved to and is held in its actuated position, thereby preventing the interposer from entering the notch 301 to the rear of the abutment surface 303. The S-shaped part of the interposer therefore comes against the left side face of the bar 143, and can move no further. The spring part 275 cannot compress, but the spring part 265 can and does compress so as to permit the necessary longitudinal movement of the wire 231 even though the interposer cannot move with it because the bar 143 is in the way.

With the particular spring construction shown, very little force is required to compress the spring 265 or expand the spring 275, so that the clamping of the interposer in effective position offers very little resistance to the return movement of the wire 231 (Fig. 14), and the blocking of longitudinal movement of the interposer by an already actuated bar 143 also offers very little resistance to the next actuation of the interposer wire 231 (Fig. 15). The construction therefore works extremely well, under the difficult and exacting conditions of operation imposed on apparatus of this kind.

It is believed that the operation of the switching structure as a whole will be obvious from the preceding description of the individual parts. However, to recapitulate very briefly, when a particular vertical stack or bank of line conductors 73, mounted on one of the line plates 31, is to be electrically connected to a particular vertical stack or bank of cross conductors 67, the selector magnet 253 for this particular bank of cross conductors is first energized, to actuate the individual selector wire 231 relating to this particular bank of cross conductors. All of the interposers mounted on this actuated wire 231 will thus be moved into effective position (the position shown diagrammatically in Fig. 12) although only one of them will actually be used. A brief instant after the selector magnet 253 is energized, the particular actuating magnet or holding magnet 121 for the particular line plate 31 in question will be energized, thereby causing rearward longitudinal movement of the actuator bar or hold bar of this particular line plate 31. This will rock the rocker 181, 185, etc., which is located at the crossing of the selector wire 231 which has been moved and the actuator bar 143 which is moved, thereby depressing the pusher 87 of this particular crossing, and connecting all of the line conductors 71 of this particular line plate with the respective cross conductors 67 of the selected bank of cross conductors. But the other rockers (except this one at the selected crossing point) will not be actuated. Other rockers on the same line plate 31 will not move because the interposers for these other rockers have not been shifted to effective interposing position. Other rockers on other line plates will not be moved regardless of whether or not the interposers have been moved to effective position, because the actuating bars 143 of these other line plates will not be moved. The actuating bar 143 which has been moved to effective position will be maintained in effective position to hold the switches closed, as long as its magnet 121 remains energized, even though the selecting magnet 253 is deenergized immediately after the magnet 121 is energized.

As long as the magnet 121 remains energized, there can be no further actuation of any of the switches on this particular line plate 31. However, the switches on any other line plate 31 are available for actuation, either in connection with the same bank of cross conductors or in connection with any other bank of cross conductors.

The switches and other connections for energizing the respective selecting magnets 253 and actuating magnets 131 may be of any suitable known form and do not constitute part of the present invention.

In a typical form of the present invention, as shown in Figs. 1–3, the cross conductors or channel conductors 67 extend continuously across all of the line plates 31, going out to the terminals 307, one for each separate cross conductor 67, mounted on respective insulating plates 309 individual to each vertical row or bank of cross conductors and held on the right hand side plate 43 of the structure. However, it is entirely possible to have what may be termed an individual lead-out; that is, to make the cross conductors 67 in short sections, one section individual to each of the line plates 31, instead of having them run continuously through two or more line plates. If the cross conductors 67 are made in short sections, each section would, of course, contain a pair of the spring fingers 107 and 109 with the contact pieces 103 and 105 thereon, and each section would be individually connected to a conductor leading to an individual terminal.

The preferred form of individual lead-out structure is shown in Figs. 17–20. The flat plate 63 (in the structure shown in Fig. 3) is now replaced by a plate 363 molded from plastic insulating material, and riveted in upright position to one side of the metal line plate 31. The molded plate 363 has a vertically extending series of openings 365, one alined with each channel bar 367, and also has a series of laterally extending lugs or brackets 369 molded integrally with the plate 363. These brackets 369 project horizontally in cantilever fashion from the vertical palte 363 (see especially Figs. 18 and 20) and are strengthened by oblique connecting webs 371 molded integrally with the plate and the brackets.

Each of these cantilever brackets 369 serves as a support for one channel bar 367 fixed securely on its bracket. Each channel bar corresponds in general to a short length of one of the channel bars 67 (Figs. 1–3) and has one pair of spring tongues 107 and 109, identical with those described in connection with the channel bars 67, which tongues carry the same contact members 103 and 105 as previously described.

The molded brackets 369 have lateral faces which are inclined inwardly or slightly undercut through part of their lengths. The depending side flanges on each channel member 367, originally positioned vertically, are squeezed laterally inwardly as indicated diagrammatically at 373 (Figs. 17 and 20) when the channel member is assembled on its bracket 369, thus anchoring the channel member tightly and immovably on its bracket. At the end of each channel member adjacent the plate 363, each depending side flange of the channel member has a small ear 375 which, upon assembly, is bent laterally across the end of the channel to make firm electric contact with a small metal plate 377 constituting an enlargement of the upper end of a metallic conductor strip 379 molded into the insulating plate 363 and projecting at the lower end of the insulating plate to form an accessible terminal 381. As best seen in Fig. 19, the various conductors 379 (one for each channel member 367) are bent in various directions as necessary to avoid contact with the other similar conductors, with the result that each of the individual channel members has its own individual electrical terminal 381.

With this individual lead-out arrangement, the channel bar terminals 307 previously described are omitted, but the line terminals 72 for the line conductors 71 are retained. When an interposer rod 231 is actuated, followed by actuation of an actuator bar 143, the pusher 87 at the crossing point of these two members 231 and 143 will be pushed down, and each of the line conductors 71 affected by the particular pusher 87 which has been actuated will be connected to one of the individual channel members 367 and one of the individual terminals 381.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An electric switch comprising a first series of electrical conductor members extending in one direction approximately parallel to each other, a second series of electrical conductor members extending in another direction crosswise to the direction of the members of the first series and normally out of contact with but relatively close to portions of the members of the first series, a plurality of pusher members, one located at each crossing point where a conductor member of the first series crosses a conductor member of the second series, each pusher member being movable from a normal rest position wherein its associated conductor member of the first series is out of contact with its associated conductor member of the second series to an actuated position displacing its associated conductor member of the first series into electrical contact with its associated conductor member of the second series, a bellcrank operatively connected to each pusher member to move the same from rest position to actuated position, an actuator bar extending past a plurality of bellcranks and having a plurality of abutment shoulders spaced longitudinally thereof, one for each bellcrank past which the actuator bar extends, means for moving the actuator bar rectilinearally longitudinally, a plurality of selector members extending crosswise to said actuator bar, means for moving any selected one of said selector members rectilinearally longitudinally, and a plurality of interposer members connected to the respective selector members, each interposer member having an interposer portion normally lying out of the path of travel of one abutment shoulder on one of said actuator members and capable of being moved, by longitudinal movement of the selector member on which it is mounted, into a position in the path of travel of said one of said abutment shoulders to lie between such abutment shoulder and an arm of one of said bellcranks, so that subsequent longitudinal movement of said actuator member will move the interposer member which has been shifted to said effective position and, through movement of said interposer member, will move said bellcrank to operate said pusher member to shift one of said conductor members of the first series into electrical contact with one of said conductor members of the second series.

2. A crossbar electric switch including a first series of conductors extending in a first direction, a second series of conductors normally out of contact with said first series of conductors and extending in a second direction crossing said first direction, and means for moving a selected one of the conductors of said first series into contact with a selected one of the conductors of the second series at a selected crossing point to make electric contact between a conductor of the first series and a conductor of the second series at the selected crossing point, said moving means comprising a separate deflecting member at each crossing point for engaging a conductor of one series at the crossing point and deflecting it into contact with a conductor of the other series, a series of actuator bars each movable rectilinearally longitudinally in the direction of one of said series of conductors and each carrying a plurality of abutments spaced from one another longitudinally of the conductor, a rocker operatively connected to each deflecting member and having one arm for receiving motion from one of said abutments upon longitudinal motion of an actuator bar and another arm for transmitting motion to said deflecting member, a series of selector bars each movable rectilinearally longitudinally in a direction across the direction of movement of said actuator bars, and a series of connecting elements mounted on each of said selector bars, one adjacent each of said actuator bars, each connecting element being movable with movement of the selector bar on which it is mounted, between an effective position operatively connecting one of said rockers to one of the abutments of one of said actuator bars to receive motion therefrom, and an ineffective position forming no operative connection between any rocker and any actuator bar.

3. A construction as defined in claim 2, in which each of said connecting elements includes a flexible curved interposer having one arm which, when in effective position, is engaged by said actuator bar to be moved thereby and another arm for engaging said rocker to move it, the curvature of said interposer serving to cushion impact when said actuator begins to move.

4. A construction as defined in claim 3, in which said interposer is curved approximately into the shape of the letter S, the top and bottom legs of said S extending perpendicular to the path of movement of said actuator bar.

5. A construction as defined in claim 3, in which said interposer is operatively connected to the selector bar on which it is mounted, by means of a spring assembly including a first coil spring portion axially expansible but not compressible, a second coil spring portion which is compressible, and a guide rod extending through said second spring portion and limiting axial expansion thereof.

6. An interposer assembly for crossbar switches, said assembly comprising a selector bar, two coil spring portions axially alined in tandem relation to each other and parallel to said selector bar, the first of said portions being axially expansible but not compressible, the second of said portions being axially compressible, a guide rod extending through said second portion and limiting axial expansion thereof, a holding member attached to said selector bar and encircling said guide rod near the end thereof remote from the first spring portion, and an interposer supported by the first spring portion at the end thereof remote from said holding member, said interposer projecting axially beyond the first of said spring portions.

7. A construction as defined in claim 6, in which said interposer includes a U-shaped portion resiliently engaged within and held by one end of said first spring portion, a guide finger projecting axially from one leg of said U-shaped portion, and an S-shaped flange projecting laterally from said guide finger.

8. A construction as defined in claim 2, in which each conductor of the first series has a continuous strip part extending past certain conductors of the second series and a series of branches each connected at one end to said continuous strip part, the other end of each branch overlying one of the conductors of the second series in position to make contact therewith when deflected by normal movement of said deflecting member.

9. A construction as defined in claim 8, in which each deflecting member has a slot for receiving said other end of its branch of the conductor, and in which said other end of each branch is inserted in said slot under initial spring tension maintained by the inherent resilience of the material of which said branch is made.

10. A construction as defined in claim 2, in which each of said rockers is mounted on a stationary part for rolling movement thereon.

11. A rocker unit for a crossbar switch, said unit comprising a stationary lug, a rocker in the general form of a bellcrank lever mounted for turning movement relative to said lug, said rocker having an edge lying against said lug to roll thereon, to form an axis for turning movement of said rocker relative to said lug, and a U-shaped spring clip engaging both said lug and said rocker and exerting force thereon to maintain said edge of said rocker in firm contact with said lug, said clip also having alining lugs thereon to engage said rocker to maintain it against displacement from said lug in certain directions other than the direction in which said spring clip exerts force against said rocker.

12. A construction as defined in claim 2, in which the conductors of the second series are formed in individual short sections each capable of making contact with only one of the conductors of the first series, each short section having a separate individual electric terminal separate from the terminals of other sections for making individual electric connection with a conductor.

13. A construction as defined in claim 12, further including a stack of a plurality of individual sections of conductors of the second series, for respective contact with a stack of conductors of the first series, a molded insulating plate having a plurality of supporting brackets molded integrally thereon, one of the individual sections of the conductors of the second series being mounted on each of said brackets, a plurality of terminals projecting from one edge of said insulating plate, and conductors molded into said plate and electrically connecting each of said terminals to one of said individual sections of conductors of the second series.

14. A conductor assembly for a crossbar switch, said assembly comprising a member formed of beryllium copper and having a channel shaped cross section, a pair of spring tongues formed integrally from the base flange of said channel member, said tongues having free ends facing and slightly separated from each other and base ends remote from each other and integrally connected to said base flange, said tongues both being arched to substantially the same degree out of the plane of said base flange, and contact portions of different metal mounted on said tongues near the free ends thereof.

15. A crossbar electric switch comprising a first series of conductors extending in a first direction, a second series of conductors normally out of contact with said first series of conductors and extending in a second direction crossing said first direction, and means for moving a selected one of the conductors of said first series into contact with a selected one of the conductors of the second series at a selected crossing point to make electric contact between a conductor of the first series and a conductor of the second series at the selected crossing point, said moving means comprising a separate deflecting member at each crossing point for engaging a conductor of one series at the crossing point and deflecting it into contact with a conductor of the other series, a series of actuator bars, each movable longitudinally in the direction of one of said series of conductors and each carrying a plurality of abutments spaced longitudinally thereof, means for moving each actuator bar longitudinally, and means for transmitting motion of an actuator bar to a selected deflecting member comprising a selector bar movable longitudinally in a direction across the direction of movement of the actuator bars, a plurality of interposers, spring means for resiliently connecting each interposer with said selector bar and permitting limited relative movement between said slector bar and said interposer in both directions of movement of said selector bar, and means for moving said selector bar to position one of said interposers for engagement by an abutment of a selected actuator bar so that on movement of said selected actuator bar a selected deflecting member is moved.

16. A crossbar electric switch as defined in claim 15 wherein the spring means for connecting each interposer to the selector bar comprises a first coil spring portion axially expansible but not compressible, a second coil spring portion coaxial with said first coil spring portion and axially compressible, and means for limiting axial expansion of said second coil spring portion.

17. A crossbar electric switch as defined in claim 15 in which each conductor of the first series comprises a continuous flexible strip part and a series of arms offset from but parallel to said strip part and displaced from one another longitudinally of said strip part, each of said arms being integral with said strip part and being connected thereto at one end only but overlying one of the conductors of the second series in position to make contact therewith when deflected by movement of said deflecting member.

18. A crossbar electric switch as defined in claim 2 in which each conductor of the first series comprises a continuous flexible strip part and a series of arms offset from but parallel to said strip part and displaced from one another longitudinally of said strip part, each of said arms being integral with said strip part and being connected thereto at one end only but overlying one of the conductors of the second series in position to make contact therewith when deflected by movement of said deflecting member.

References Cited in the file of this patent

UNITED STATES PATENTS

| | | |
|---|---|---|
| 1,630,896 | Herskovitz | May 31, 1927 |
| 1,911,803 | Burns | May 30, 1933 |
| 2,729,706 | Vincent | Jan. 3, 1956 |
| 2,731,516 | Vincent | Jan. 17, 1956 |
| 2,802,257 | Holtzapple | Aug. 13, 1957 |
| 2,818,632 | Hammell | Jan. 7, 1958 |